Jan. 18, 1966  M. J. RENQUIST  3,229,344
SHEET OR PAGE TURNER AND MARKER
Filed Feb. 24, 1964
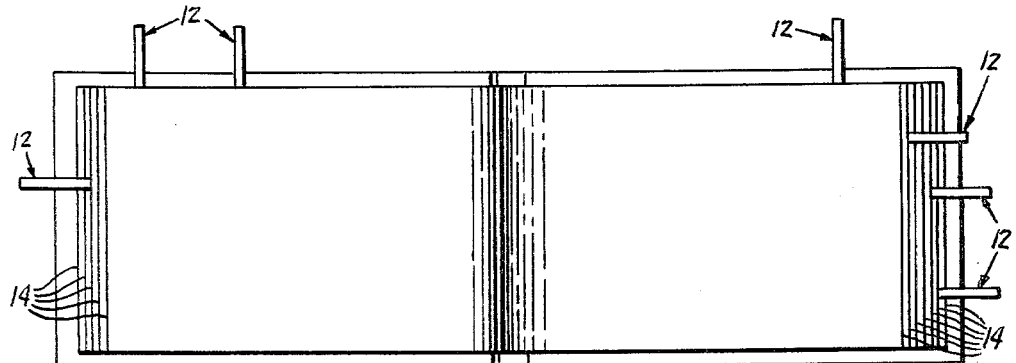
*FIG. 1*
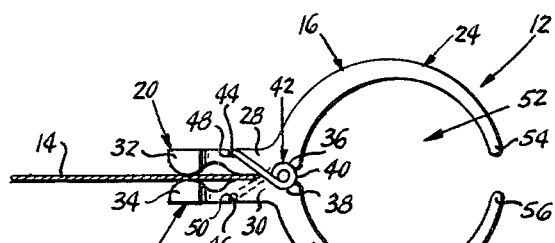
*FIG. 2*
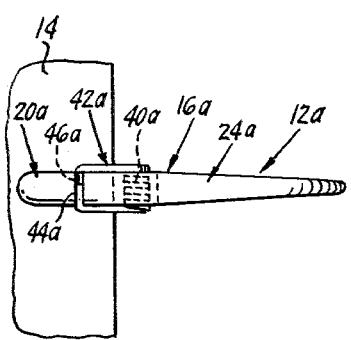
*FIG. 5*  *FIG. 3*
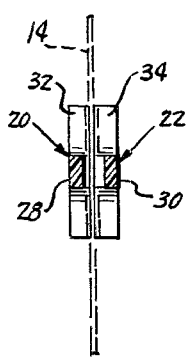
*FIG. 4*
INVENTOR.
MERVIN J. RENQUIST
BY
Kimmel & Crowell
ATTORNEYS.

United States Patent Office 3,229,344
Patented Jan. 18, 1966

3,229,344
SHEET OR PAGE TURNER AND MARKER
Mervin J. Renquist, Julesburg, Colo.
Filed Feb. 24, 1964, Ser. No. 346,988
2 Claims. (Cl. 24—252)

This invention relates to a sheet turner and marker and more particularly to a device which is selectively engageable with one or a plurality of pages of a book or sheets of music to facilitate marking the same for later reference and to enable the user to quickly and easily turn to a selected page.

A primary object of this invention is the provision of a sheet turner and marker which is sturdy and durable in construction, reliable and efficient in operation, and relatively simple and inexpensive to manufacture, assembly, and utilize.

Another object of this invention is the provision of a device of the type described including a clip means readily engageable with a selected sheet and a finger receiving means extending away from the selected page for easy access by a user.

A further object of the instant invention is to provide such a device wherein the finger receiving means extends substantially perpendicularly to the plane of the selected sheet to facilitate grasping the same.

A still further object of this invention is the provision of a page turner and marker having clip means with an elongated portion to grippingly engage a substantial part of the selected sheet inward of its edge.

Other and further objects reside in the combination of elements, arrangement of parts, and features of construction.

Still other objects will in part be obvious and in part be pointed out as the description of the invention proceeds and as shown on the accompanying drawing wherein:

FIGURE 1 is a front elevational view of a book or a plurality of sheets of music showing a multiplicity of page turners and markers in accordance with the instant inventive concept engaged with various selected pages or sheets thereof;

FIGURE 2 is an enlarged side elevational view of one page turner and marker showing a fragmentary section of a page of a book or a sheet of music engaged thereby;

FIGURE 3 is a top plan view of the same with a portion of the selected page or sheet of music shown in dotted lines;

FIGURE 4 is a transverse cross-sectional view taken substantially on line 4—4 on FIGURE 3; and FIGURE 5 is a view similar to FIGURE 3 of a modified embodiment of the device of the instant invention.

Similar reference characters refer to similar parts throughout the several views of the drawing.

Referring now to the drawing in general and more particularly to FIGURE 1, a book or a plurality of sheets of music are designated generally by the reference numeral 10 with a multiplicity of sheet turners and markers 12 being shown as engaging various pages or sheets 14 of the same.

With particular reference now to FIGURES 2 to 4, the sheet turner an markers 12 each comprise opposed elements 16, 18, each having a substantially straight clip portion 20, 22, and an arcuately curvilinear finger receiving portion 24, 26.

The clip portions 20, 22 are each substantially T-shaped having a stem portion 28, 30 and an elongated cross bar portion 32, 34. The stem portions 28, 30 have recesses 36, 38 defined therein to receive the coil portion 40 of a spring means 42. Opposite crossed ends 44, 46 of the spring means 42 engage in depressions 48, 50 in the tops of the clip portions 20, 22. The opposed edges of the cross bar portion 32, 34 are arcuately curvilinear to grippingly engage a selected page 14 at an area inwardly of the edge thereof under the influence of the spring means 42 which normally biases the cross bar portions 32, 34 towards each other.

The curved finger receiving portions 24, 26 together define a substantially closed loop 52 extending substantially perpendicularly to the plane of the selected page 14, the terminal ends 54, 56 of the arcuate portions 24, 26 being only slightly spaced from each other to allow the cross bar portions 32, 34 of the clip portions 20, 22 to be clamped together or separated from each other against the urging of the spring means 42 for engagement with, and disengagement from, a selected page 14. The small clearance between the end portions 54, 56 of 24 and 26, help in engaging only a single sheet and not a plurality of sheets because the clips open up only a small amount.

The use and operation of the device of the instant invention will now be apparent. By pressing the arcuate portions 24, 26 toward each other, the cross bar portions 32, 34 are pivoted apart around the coil portion 40 of the spring means 42 and against the urging of the spring means 42. On release of the pressure, the cross bar portions 32, 34 grippingly engage a selected page or sheet 14 inwardly of the edge thereof. When so engaged the device will clamp a sheet at its edge and at a spaced distance from the edge. The sheets are uniformly and alignedly gripped by a plurality of devices when the sheet edge contacts the spring ends. The user may then extend a finger through the loop 52 to quickly and easily turn to a selected page.

As will be seen from FIGURE 1, the sheet turners and markers 12 may be engaged with the sides or tops of selected sheets 14 or any other convenient location.

FIGURE 5 shows a similar device wherein like parts are designated by the same reference numeral followed by the suffix "a". In this embodiment the clip portions are of substantially the same width throughout rather than T-shaped to illustrate that the device will function with simple clip elements grippingly engaging the sheet.

The devices of the instant invention can be made of plastic, light weight metal, or any other suitable material. The size of the devices may be readily varied to fit the use to which it is to be put. The devices may be provided in a variety of colors in order to assist in the marking operation.

It will now be seen that there is herein provided an improved sheet turner and marker which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

I claim:

1. A sheet turner and marker including two members each including a longitudinal clip means at one end and an oppositely directed curvilinear finger receiving means at the other end,
    the two members being held in pivoted and left and right relationship by a single coil spring means mounted medially of and partially in each of the members and having crossed spring ends contacting the held clip means and biasing the two clip means toward each other into mutual relationship with respect to each other
    the clip structures each being platelike and, in plan, formed as substantially T-shaped and possessing an elongated crossbar connected to a central stem, each crossbar, in side elevation, formed with a curved end projection, the curves at the extreme ends being vertical and merging smoothly to horizontal at the bearing portion of the crossbar, said central stem, in side elevation, formed with a recess adjacent the crossbar, and a flat gripping area extending between said recess and the adjacent cross spring ends, whereby a selected sheet may be grippingly engaged both at an extreme edge area and at a substantial area inwardly of said edge area, and whereby the curved ends of the crossbars contiguous to a sheet prevent sharp creases in the sheet when the latter is turned by initial movement of the finger receiving means, said curvilinear finger receiving means being aligned about a single plane which extends perpendicularly of the plane of the gripping areas of the clips and said curvilinear finger receiving means together define a substantially closed loop with only a small gap between the terminal ends of the curvilinear portions, whereby to limit the separation of the gripping areas of the clip means upon pressing together said curvilinear portions of the finger receiving means, and thus making it more certain in use that only one sheet and not a group of sheets will be engaged.

2. A sheet turner and marker including two members each including a longitudinal clip means at one end and an oppositely directed curvilinear finger receiving means at the other end, the two members being held in pivoted and left and right relationship by a single coil spring means mounted medially of and partially in each of the members and having crossed spring ends contacting the held clip means and biasing the two clip means toward each other into mutual gripping relationship with respect to a selected sheet, the clip structures each being platelike and, in plan, formed as substantially T-shaped and possessing an elongated crossbar connected to a central stem, each crossbar, in side elevation, formed with a curved end projection, the curves at the extreme ends being vertical and merging smoothly to horizontal at the bearing portion of the crossbar, said central stem, in side elevation, formed with a recess adjacent the crossbar, and a flat gripping area extendiing between said recess and the adjacent cross spring ends, whereby a selected sheet may be grippingly engaged both at an extreme edge area and at a substantial area inwardly of said edge area and whereby the curved ends of the crossbars contiguous to a sheet prevent sharp creases in the sheet when the latter is turned by initial movement of the finger receiving means.

References Cited by the Examiner

UNITED STATES PATENTS

| 1,492,201 | 4/1924 | Carle et al. | 24—252 |
| 1,546,228 | 7/1925 | Gray | 24—81 |
| 1,580,772 | 4/1926 | Ashton | 24—81 |
| 2,631,560 | 3/1953 | Myers | 116—119 |
| 3,039,159 | 6/1962 | Burke | 24—81 |

FOREIGN PATENTS

| 3,733 | 1879 | Great Britain. |
| 18,800 | 1910 | Great Britain. |
| 532,154 | 1/1941 | Great Britain. |
| 451,457 | 9/1949 | Italy. |
| 109,492 | 3/1925 | Switzerland. |

WILLIAM FELDMAN, *Primary Examiner.*

DONLEY J. STOCKING, *Examiner.*

D. GRIFFIN, *Assistant Examiner.*